June 7, 1966 K. W. EASEY 3,254,869
VALVING DEVICE FOR A FLEXIBLE PLEATED CONDUIT
Filed April 11, 1962
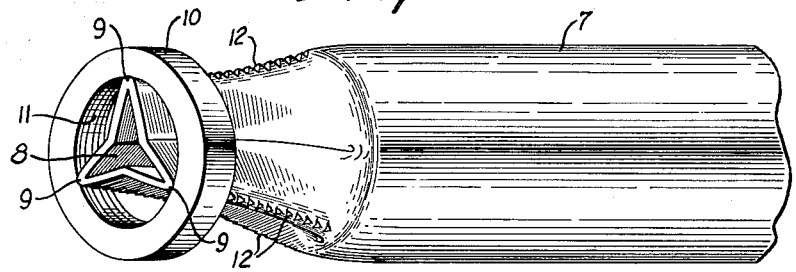
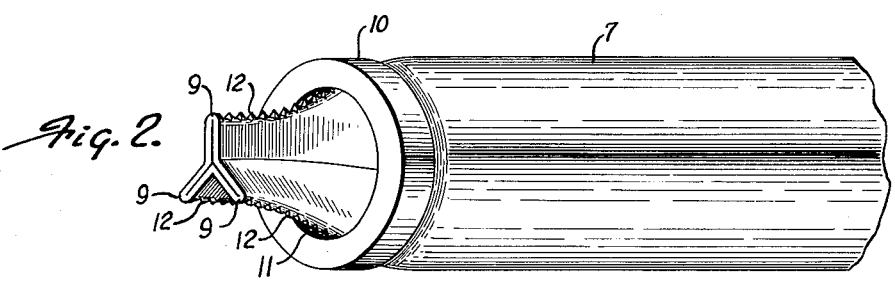
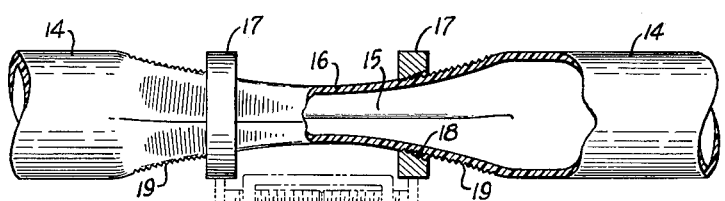
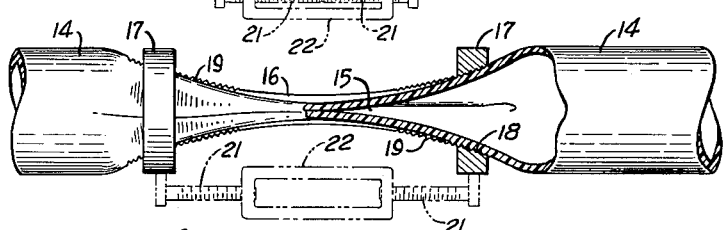
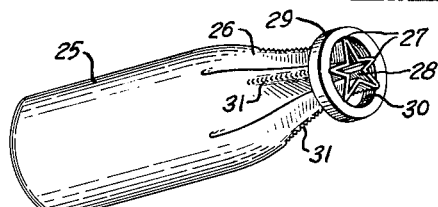
INVENTOR.
KENNETH W. EASEY
BY
Lieber, Lieber & Nilles
ATTORNEYS United States Patent Office 3,254,869
Patented June 7, 1966

3,254,869
VALVING DEVICE FOR A FLEXIBLE
PLEATED CONDUIT
Kenneth W. Easey, 3750 N. 88th St., Milwaukee, Wis.
Filed Apr. 11, 1962, Ser. No. 186,764
2 Claims. (Cl. 251—4)

The present invention relates to improvements in the art of controlling the flow of fluids through passages, and it relates more specifically to an improved device for closing and opening the passages through flexible conduits, or for merely varying the cross-section thereof in order to increase or diminish the flow of diverse fluent materials through the conduits.

The primary object of the invention is to provide an improved device for controlling the delivery or flow of fluids from or through flexible walled conduits.

Some of the more important specific objects of the invention are as follows:

To provide an improved mode of regulating the rate of flow of various fluent materials through a conduit having a pleated flexible wall in a manner whereby precise and accurate control of the rate of flow may be effected with the aid of readily manipulable instrumentalities;

To provide a simple flow control assemblage readily applicable to conduits or fluid dispensing outlets of various types and which may be formed of diverse flexible materials such as plastic, metal, Fiberglas or the like and may also be associated with different fluid conductors such as pipes, collapsible tubes, bottles, or other containers;

To provide an improved flow control for fluid conducting passages wherein the wall of the passage is provided with an annular series of longitudinal flexible pleats which are progressively compressible to vary the effective internal area of the passage;

To provide a flow control assemblage for a conduit forming a fluid passage bounded by a series of longitudinally extending and tapered pleats and wherein all of the pleats are simultaneously foldable to regulate the flow by applying pressure to all of the pleats in the direction of their tapers.

These and other objects and advantages of the invention will be apparent from the following detailed description.

A clear conception of the several steps involved in the method and of the construction and functioning of several types of flow controls embodying the invention may be had by referring to the drawing accompanying and forming a part of this specification wherein like reference characters designate similar parts in the various views.

FIG. 1 is a perspective view of a collapsible tube for dispensing fluent material, the tube having its material dispensing end opened;

FIG. 2 is another perspective view of the same collapsible triple-pleated tube but showing the passage through the dispensing end thereof sealed by the flow control device;

FIG. 3 is a part sectional side view of an elongated conduit which is provided intermediate its ends with one of the improved flow control devices, showing the conduit open to permit free flow of fluid therethrough, and also illustrating diagrammatically one type of linkage for simultaneously moving a pair of flow regulators;

FIG. 4 is a similar view of the conduit of FIG. 3 but showing the conduit passage sealed by the flow control device; and FIG. 5 is a perspective view of a bottle for fluent material having its dispensing neck provided with an annular series of five folds or pleats and means for contracting the pleats to seal the bottle.

While the invention has been shown and described herein as having been embodied in only a few types of conduits or containers, it is not desired to restrict its use to these types or to the number of pleats or folds shown; and it is also contemplated that specific descriptive terms used herein be given the broadest interpretation consistent with the disclosure.

Referring to FIGS. 1 and 2 of the drawing, the improved assemblage shown therein comprises in general a collapsible tube 7 for confining fluent material and having a dispensing opening 8 at one end bounded by an annular series of three folds or pleats 9 spaced uniformly about the central tube axis and being tapered toward the collapsible tube body; and a rigid tube closing ring 10 having internal screw threads 11 cooperable with serrations 12 formed on the external folds of the pleats 9. The pleated end of the tube 7 is formed of flexible and relatively resilient substance such as plastic or metal, so that the pleats 9 will automatically open the passage or opening to its maximum extent when the ring 10 is removed or disposed at the extreme end of the tube 7 as in FIG. 1. However, when the ring 10 is advanced in the direction of the taper along the pleats 9 by rotating this ring about the tube axis, then the area of the dispensing opening 8 and the resultant flow of fluent material will be progressively diminished to eventually seal this opening as in FIG. 2. If the ring 10 is subsequently revolved and advanced in the opposite direction along the pleats 9, the inherent resiliency of the folds will cause them to expand and gradually enlarge the opening 8 to its fullest extent.

Referring to FIGS. 3 and 4, the conduit 14 has its medial portion provided with a flow control passage 15 for fluent material surrounded by an annular series of folds or pleats 16 spaced equidistant about the conduit axis and tapered in opposite directions toward the adjacent conduit sections; and a pair of rigid passage control rings 17 having internal screw threads 18 coacting with serrations 19 formed on the external folds of the pleats 16. The pleats 16 are formed of flexible and resilient substance such as plastic or metal and are biased to automatically open the passage 15 when the rings 17 are positioned near each other as in FIG. 3, but when these rings are rotated the screw threads 18 thereof engage and advance along the serrations 19 thereby gradually causing them to force the pleats 16 into passage sealing condition as in FIG. 4. By rotating the rings 17 in the opposite direction, the inherent resiliency of the pleats 16 will cause them to expand and gradually enlarge the passage 15 to its fullest extent.

Since it is desirable to cause the rings 17 to advance simultaneously in opposite directions, they may be interconnected by suitable means such as linkage 21 manipulable by a turnbuckle 22 or other means for insuring such advancement, but such manipulating means is not essential. In cases wherein the rings 17 are coupled together for simultaneous movement, the screw threads 18 and serrations 19 may, of course, be eliminated to permit sliding movement.

Referring to FIG. 5, the bottle 25 shown therein has its neck portion 26 provided with an annular series of five longitudinally tapered folds or pleats 27 forming a fluid dispensing opening 28, and this series of pleats is surrounded by a rigid flow controlling ring 29 having internal screw threads 30 coacting with serrations 31 formed on the tapered outer edges of the pleats 27. When the ring 29 is disposed at the extreme free ends of the pleats 27 as in FIG. 5, the dispensing opening will be fully open, but when the ring 29 is rotated to cause the screw threads 30 to move it along the serrations 31 of the tapered pleats toward the body of the bottle 25, then the pleats 27 will be folded into snug engagement to seal the opening 28.

The number of pleats may obviously be varied to meet diverse conditions, and in cases where the control ring is disposed near the free ends of the pleats when the fluid passage is fully open as in FIGS. 1 and 5, it may be desirable to provide a stop lug or lugs at these ends in order to prevent the ring from becoming separated from the assemblage. In each case, however, the fluid conduit is provided with an annular series of longitudinal tapered pleats and a control ring is movable along the conduit in the direction of the taper of the pleats to vary the effective internal area of the conduit passage, and to positively seal this passage if so desired. The device may be applied to locally pleated and resilient portions of various types of conduits or containers to control the flow of diverse fluids such as liquids or semi-liquids and other fluent substances, and may be produced at nominal cost.

Various modes of carrying out the invention are contemplated as being within the scope of the following claims particularly pointing out and distinctly claiming the subject matter which is regarded as the invention:

I claim:

1. A fluid flow control device comprising, a conduit having a wall provided with an annular series of longitudinally directed tapered flexible pleats biased to open the passage through the conduit when released from external pressure, the external folded edges of said pleats being the serrations of the pleat edges and movable therealong upon rotation to collapse the pleats and close said passage, the degree of said opening being proportional to the extent of the movement of said internally threaded means along the conduit.

2. In a device for controlling flow of fluid, a flexible conduit having an annular series of longitudinal pleats the external folded edges of said pleats being serrated to provide external screw threads and means having threaded coaction with said external folded edges whereby rotation thereof causes its movement longitudinally relative to said conduit to thereby progressively compress said pleats to vary the effective internal area of said conduit.

References Cited by the Examiner

UNITED STATES PATENTS

| 68,712 | 9/1867 | Crook | 239—546 |
|---|---|---|---|
| 1,264,479 | 4/1918 | Barth | 137—1 |
| 1,865,012 | 6/1932 | Jackson | 251—8 X |
| 2,135,237 | 11/1938 | Lewis | 222—507 X |
| 2,338,759 | 1/1944 | Fortune | 251—8 |
| 2,573,712 | 11/1951 | Kallam | 251—5 |
| 2,593,420 | 4/1952 | Diehl | 239—546 X |
| 2,640,675 | 6/1953 | Farris | 251—8 |
| 2,748,666 | 6/1956 | Forrest | 137—1 |
| 2,901,152 | 8/1959 | Wahnsiedler | 222—507 X |
| 2,978,866 | 4/1961 | Clark | 239—455 X |
| 3,102,710 | 9/1963 | Dresden | 251—9 |

FOREIGN PATENTS 500,322   1954   Italy.

ISADOR WEIL, *Primary Examiner.*